(12) United States Patent
Yanase

(10) Patent No.: US 9,641,704 B2
(45) Date of Patent: May 2, 2017

(54) INFORMATION PROCESSING SYSTEM, INFORMATION PROCESSING APPARATUS, AND CONTROL METHOD

(71) Applicant: Masatoshi Yanase, Kanagawa (JP)

(72) Inventor: Masatoshi Yanase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/978,472

(22) Filed: Dec. 22, 2015

(65) Prior Publication Data

US 2016/0191726 A1 Jun. 30, 2016

(30) Foreign Application Priority Data

Dec. 25, 2014 (JP) ................................ 2014-263300
Dec. 21, 2015 (JP) ................................ 2015-249111

(51) Int. Cl.
*H04N 1/32* (2006.01)
*H04N 1/00* (2006.01)
*G06Q 30/04* (2012.01)

(52) U.S. Cl.
CPC ......... *H04N 1/00244* (2013.01); *G06Q 30/04* (2013.01); *H04N 1/00411* (2013.01); *H04N 1/32512* (2013.01); *H04N 2201/0032* (2013.01); *H04N 2201/0094* (2013.01)

(58) Field of Classification Search
None
See application file for complete search history.

(56) References Cited

U.S. PATENT DOCUMENTS

| 5,727,135 | A | * | 3/1998 | Webb | G06F 3/1204 358/1.14 |
| 9,256,389 | B2 | * | 2/2016 | Maki | G06F 3/1285 |
| 2002/0128875 | A1 | * | 9/2002 | Parry | G06Q 30/02 705/4 |
| 2006/0080184 | A1 | * | 4/2006 | Zhang | G06Q 30/0283 705/26.1 |

(Continued)

FOREIGN PATENT DOCUMENTS

| JP | 11-194674 | 7/1999 |
| JP | 4660856 | 1/2011 |
| JP | 2016-154331 | 8/2016 |

OTHER PUBLICATIONS

May 3, 2016 European Search Report in corresponding European Patent Application No. EP 15202711.6.

*Primary Examiner* — Ted Barnes
(74) *Attorney, Agent, or Firm* — Cooper & Dunham LLP

(57) ABSTRACT

An information processing system includes an information processing apparatus that is capable of being remotely operated by a remote operation terminal via a network, an execution unit that executes a job in accordance with operation, a first operation receiving unit that receives operation of the remote operation terminal for the execution unit, a second operation receiving unit that receives operation for the execution unit, a determining unit that determines whether operation is received by the first operation receiving unit or the second operation receiving unit, a charging determining unit that determines whether the job executed by the execution unit is an object for charging in accordance with the result determined by the determining unit, and a storing unit that stores therein the result determined by the determining unit.

8 Claims, 14 Drawing Sheets

(56) References Cited

U.S. PATENT DOCUMENTS

| | | | |
|---|---|---|---|
| 2008/0181651 A1* | 7/2008 | Takesada | G03G 21/02 399/82 |
| 2009/0009793 A1* | 1/2009 | Ozawa | G03G 15/55 358/1.15 |
| 2009/0207440 A1* | 8/2009 | Kaneko | G03G 21/02 358/1.15 |
| 2010/0014110 A1* | 1/2010 | Munetomo | H04N 1/0084 358/1.14 |
| 2011/0176161 A1* | 7/2011 | Matsumoto | G03G 21/02 358/1.14 |
| 2011/0188068 A1* | 8/2011 | Jones | G06Q 30/018 358/1.15 |
| 2013/0182271 A1* | 7/2013 | Kida | G06K 15/02 358/1.13 |
| 2014/0009794 A1* | 1/2014 | Honda | G03G 21/02 358/1.15 |
| 2014/0253947 A1* | 9/2014 | Akutsu | H04N 1/00217 358/1.14 |
| 2016/0261759 A1 | 9/2016 | Yanase | |

\* cited by examiner

FIG.9

```
OBJECT FOR CHARGING
NUMBER OF COLORED PRINTS IS 100,
NUMBER OF MONOCHROME PRINTS IS 50,

OBJECT FOR NO CHARGING
NUMBER OF COLORED PRINTS IS 5,
NUMBER OF MONOCHROME PRINTS IS 2,
 .
 .
 .
```

FIG.10A

OPERATION
INFORMATION
```
Event = click
Point = (100,200)
```

FIG.10B

OPERATOR
INFORMATION
```
IsRemoteUser = true
```

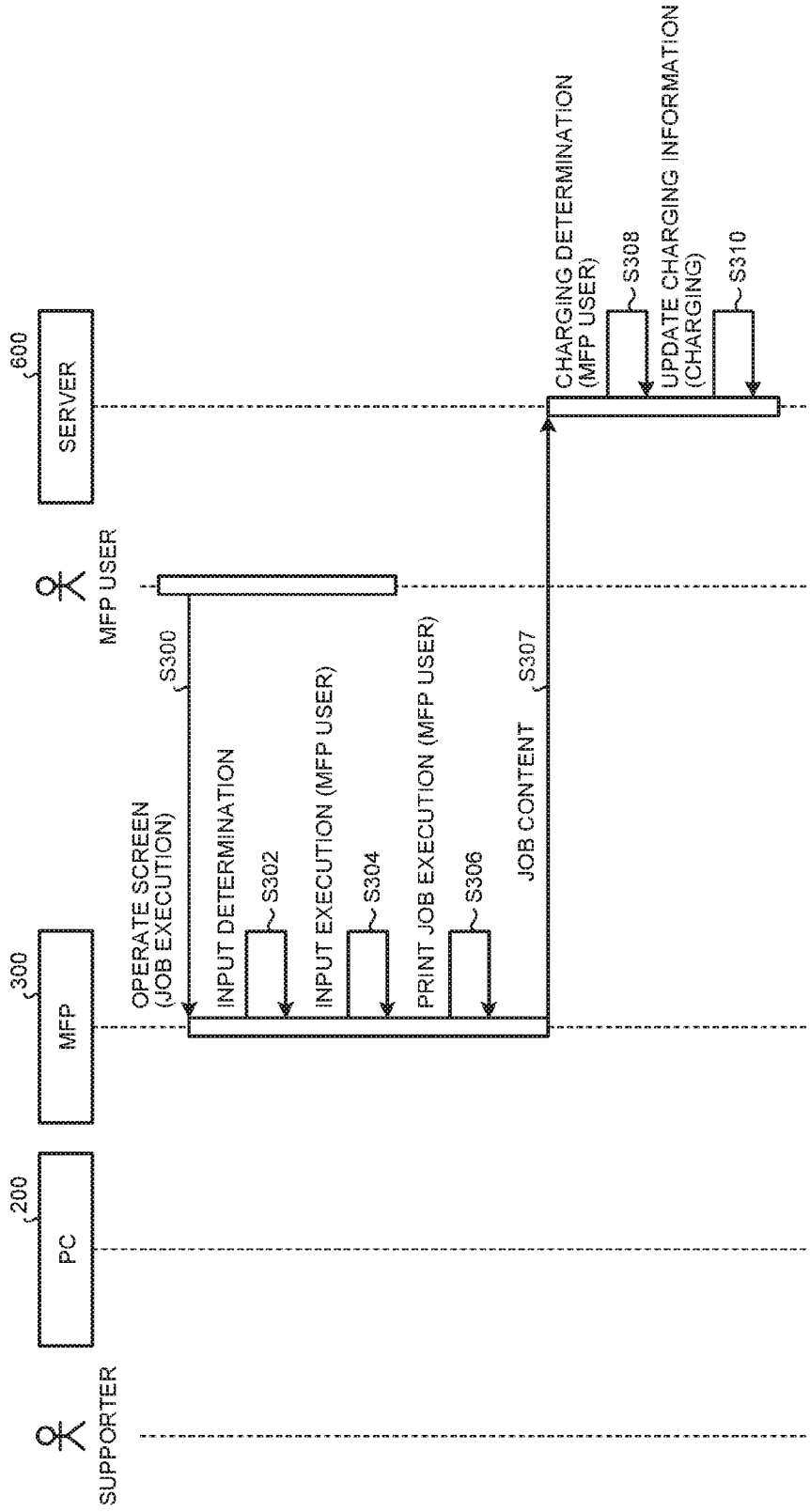

INFORMATION PROCESSING SYSTEM, INFORMATION PROCESSING APPARATUS, AND CONTROL METHOD

CROSS-REFERENCE TO RELATED APPLICATIONS

The present application claims priority to and incorporates by reference the entire contents of Japanese Patent Application No. 2014-263300 filed in Japan on Dec. 25, 2014 and Japanese Patent Application No. 2015-249111 filed in Japan on Dec. 21, 2015.

BACKGROUND OF THE INVENTION

1. Field of the Invention

The present invention relates to an information processing system, an information processing apparatus, and a control method.

2. Description of the Related Art

A user of an information processing apparatus such as a multifunction peripheral (MFP) may inquire an operator when the user is unfamiliar with the operation of the information processing apparatus, for example, in some cases. In such a case, a remote support technique is known in which a screen of an apparatus that a user uses is displayed on a screen of an operator terminal (e.g., a personal computer (PC)) in a sharing manner and the user remotely receives support.

Japanese Patent No. 4660856 discloses a remote control system that performs various types of remote operation and remote monitoring, and various remote lessons using a remote control server and a client terminal that are connected via a communication network.

The conventional remote support technique allows a supporter to execute a job such as printing when the supporter is operating the operation screen of an image forming apparatus of a user through remote operation. When the supporter is executing printing as a result of an operation error, a printing fee may be charged to the user in some cases.

In view of the above, there is a need to provide an information processing system, an information processing apparatus, and a control method that can prevent the user from being charged for the job even if the supporter has mistakenly executed a job that causes the user to be charged when the supporter is operating the operation screen of the information processing apparatus that the user uses through remote operation.

SUMMARY OF THE INVENTION

It is an object of the present invention to at least partially solve the problems in the conventional technology.

According to exemplary embodiments of the present invention, there is provided an information processing system, comprising: an information processing apparatus that is capable of being remotely operated by a remote operation terminal via a network, the remote operation terminal comprising: a first operation receiving unit that receives operation for the information processing apparatus; and a transmission unit that transmits, to the information processing apparatus, operation information indicating the operation received by the first operation receiving unit; and the information processing apparatus comprising: a receiving unit that receives the operation information transmitted by the transmission unit; an execution unit that executes a job in accordance with operation; a second operation receiving unit that receives operation causing the execution unit to execute a job; a determining unit that determines whether operation is received by the first operation receiving unit or the second operation receiving unit on the basis of the operation information or the operation received by the second operation receiving unit; a charging determining unit that determines the job executed by the execution unit is an object for charging in accordance with a result determined by the determining unit; and a storing unit that stores therein a result determined by the charging determining unit.

Exemplary embodiments of the present invention also provide an information processing system, comprising an information processing apparatus that is capable of being remotely operated by a remote operation terminal via a network to which a server is connected, the remote operation terminal comprising: a first operation receiving unit that receives operation for the information processing apparatus; and a transmission unit that transmits, to the information processing apparatus, operation information indicating the operation received by the first operation receiving unit, the information processing apparatus comprising: a receiving unit that receives the operation information transmitted by the transmission unit; an execution unit that executes a job in accordance with operation; a second operation receiving unit that receives operation causing the execution unit to execute a job; a determining unit that determines whether operation is received by the first operation receiving unit or the second operation receiving unit on the basis of the operation information or the operation received by the second operation receiving unit; and a server transmission unit that transmits the result determined by the determining unit to the server, and the server comprising: a server's receiving unit that receives the result determined by the determining unit from the server transmission unit; a charging determining unit that determines the job executed by the execution unit is an object for charging in accordance with the result determined by the determining unit; and a storing unit that stores therein a result determined by the charging determining unit.

Exemplary embodiments of the present invention also provide a control method for controlling an information processing system including an information processing apparatus that is capable of being remotely operated by a remote operation terminal via a network, the control method comprising: by a first operation receiving unit, receiving operation for the information processing apparatus; transmitting operation information that indicates the operation received by the first operation receiving unit to the information processing apparatus; receiving the transmitted operation information; executing a job in accordance with the operation; when a second receiving unit receives operation to cause the information processing apparatus to execute a job, determining whether the operation is received by the first operation receiving unit or the second operation receiving unit on the basis of the operation information or the operation received by the second operation receiving unit; determining whether the executed job is an object for charging in accordance with the determination result; and storing the result of the determination whether the executed job is an object for charging.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic diagram exemplarily illustrating a data structure of charging information stored in a storing unit;

FIGS. 10A and 10B are schematic diagrams exemplarily illustrating data structures of operation information and operator information;

FIG. 17 is a sequence diagram illustrating the operation of the image processing system in the modification when the user has caused the image processing apparatus to execute a print job using the operation panel of the image processing apparatus.

DETAILED DESCRIPTION OF THE PREFERRED EMBODIMENTS

Figure 1:
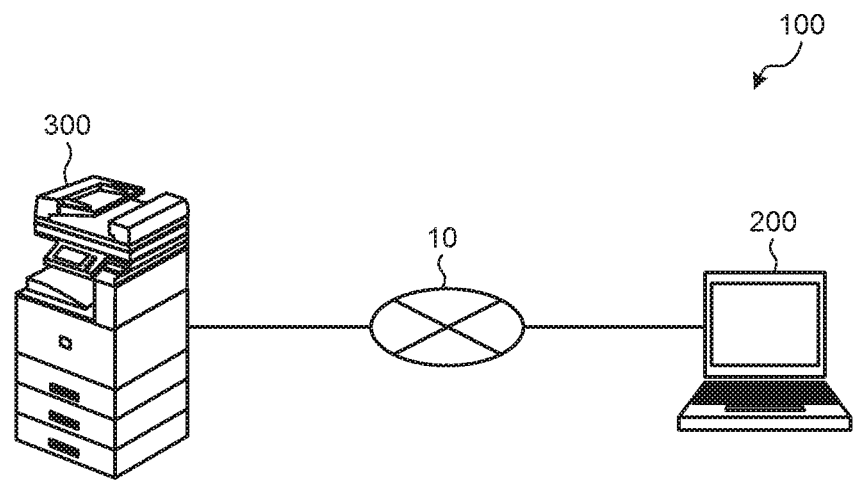
FIG. 1 is a schematic diagram exemplarily illustrating a structure of an information processing system according to an embodiment of the present invention.

The following describes an image processing system (information processing system) in an embodiment according to the present invention in detail with reference to the accompanying drawings. FIG. 1 is a schematic diagram exemplarily illustrating a structure of an image processing system (information processing system) 100 according to the embodiment. As illustrated in FIG. 1, the image processing system 100 includes a personal computer (PC) 200, which is a remote operation terminal, and an image processing apparatus (information processing apparatus) 300 that are connected each other via a network 10, which is the Internet, for example. The PC 200 can remotely operate the image processing apparatus 300.

The image processing apparatus 300 is a multifunction peripheral (MFP), for example. A user can operate the image processing apparatus 300 using an operation screen such as a touch panel (operation panel). The operation panel may be replaced with a stand-alone information processing terminal. The PC 200 receives operation by which an operator (supporter) remotely operates the image processing apparatus 300 via the network 10. The user inquires the operator by telephone, for example, in some times. The operation screen through which the user operates the image processing apparatus 300 can be shared with the operation screen (remote operation screen) of the PC 200 that the operator operates.

The user is a person who directly operates the image processing apparatus 300. The user inquires the supporter when the user is unfamiliar with the operation of the image processing apparatus 300, for example. The supporter is the operator who receives the inquiry by telephone from the user who operates the image processing apparatus 300 and remotely operates the image processing apparatus 300 from the PC 200.

Specifically, the supporter operates, first, the screen of the image processing apparatus 300 from the PC 200 so as to remotely support the user. For example, the supporter instructs a job execution command or a job setting from the PC 200 to the image processing apparatus 300. When the supporter has mistakenly executed a job such as printing, the embodiment prevents the user from being charged for the job.

Figure 2:
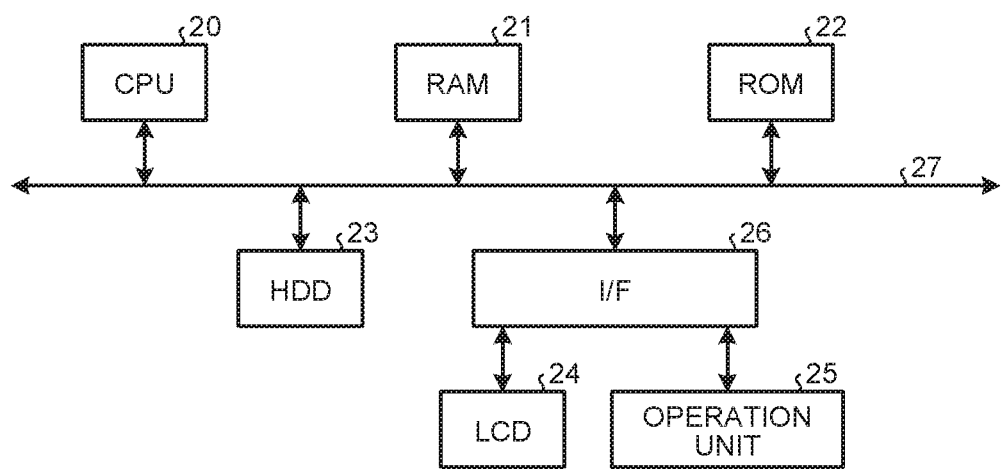
FIG. 2 is a schematic diagram illustrating a hardware structure of a personal computer (PC)

FIG. 2 is a schematic diagram illustrating a hardware structure of the PC 200. As illustrated in FIG. 2, the PC 200 has the similar structure as a typical information processing terminal. The PC 200 includes a central processing unit (CPU) 20, a random access memory (RAM) 21, a read only memory (ROM) 22, a hard disk drive (HDD) (storage unit) 23, a liquid crystal display (LCD) (display unit) 24, and an operation unit 25. The LCD (display unit) 24 and the operation unit 25 are connected to a bus 27 via an interface (I/F) 26.

The CPU 20, which is an arithmetic unit, controls operation of the whole of the PC 200. The RAM 21 is a volatile storage medium that can read and write information at a high speed, and is used by the CPU 20 as a working area when the CPU 20 processes information. The ROM 22 is a read-only non-volatile storage medium, and stores therein programs such as firmware. The HDD 23 is a non-volatile storage medium onto which information can be written or from which information can be read, and stores therein an operating system (OS), various control programs and application programs, for example. The LCD 24 is a visual user interface with which a user checks the status of the PC 200. The operation unit 25 is a user interface, such as a keyboard or a mouse, with which a user inputs information to the PC 200. The LCD (display unit) 24 and the operation unit 25 may be integrated into an operation panel such as a touch panel.

Figure 3:
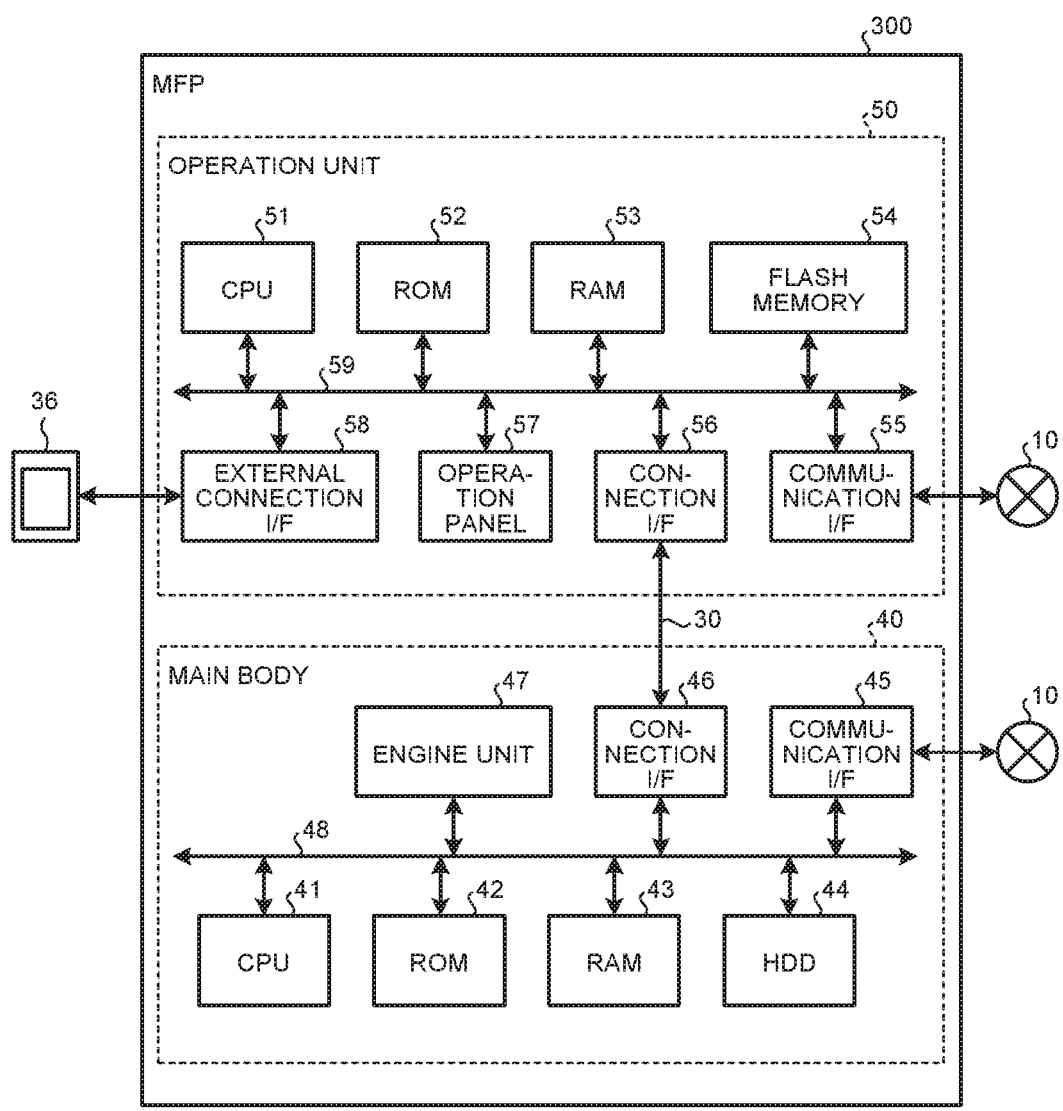
FIG. 3 is a schematic diagram illustrating a hardware structure of an image processing apparatus.

The following describes a hardware structure of the image processing apparatus 300 with reference to FIG. 3. As illustrated in FIG. 3, the image processing apparatus 300 includes a main body 40 that can achieve various functions such as copier, scanner, facsimile, and printer functions, and an operation unit 50 that receives operation from the user. The reception of the user's operation is a concept in which information (including a signal indicating the coordinates on the screen) input in accordance with the user's operation is received. The main body 40 and the operation unit 50 are connected via a dedicated communication path 30 so as to enable communication with each other. The communication path 30 is compliant with a universal serial bus (USB) standard, for example. The communication path 30 may be compliant with any standard regardless of a wireless or wire-based communication scheme.

The main body 40 can operate in accordance with the operation received by the operation unit 50. The main body 40 can communicate with an external apparatus such as the PC 200 and also operate in accordance with an instruction received from the external apparatus.

The following describes a hardware structure of the main body 40. As illustrated in FIG. 3, the main body 40 includes a CPU 41, a ROM 42, a RAM 43, an HDD 44, a communication I/F 45, a connection I/F 46, and an engine unit 47. These components are connected with one another via a system bus 48.

The CPU 41 overall controls the operation of the main body 40. The CPU 41 executes a computer program stored in the ROM 42 or the HDD 44, for example, using the RAM 43 as a working area to control the overall operation of the main body 40, thereby achieving the various functions such as the copier, scanner, facsimile, and printer functions.

The communication I/F 45 is an interface to connect the main body 40 to the network 10. The connection I/F 46 is an interface that makes the main body 40 communicate with the operation unit 50 via the communication path 30.

The engine unit 47 is hardware that performs versatile information processing and processing other than communication for achieving the copier, scanner, facsimile, and printer functions. The engine unit 47 includes a scanner (image reading section) that scans and reads an image on a document, a plotter (image forming section) that performs printing on a sheet material such as a sheet, and a facsimile section that performs facsimile communication, for example. The engine unit 47 may further include specific options such as a finisher that sorts the sheet materials after printing and an automatic document feeder (ADF) that automatically feeds documents.

The following describes a hardware structure of the operation unit 50. As illustrated in FIG. 3, the operation unit 50 includes a CPU 51, a ROM 52, a RAM 53, a flash memory 54, a communication I/F 55, a connection I/F 56, an operation panel 57, and an external connection I/F 58. These components are connected with one another via a system bus 59.

The CPU 51 overall controls the operation of the operation unit 50. The CPU 51 executes a computer program stored in the ROM 52 or the flash memory 54, for example, using the RAM 53 as a working area to control the overall operation of the operation unit 50, thereby achieving various functions such as displaying of information (images) according to the input received from the user, the functions of which are described later. The RAM 53 and the flash memory 54 also function as a storing unit that stores therein history information indicating a history of the user's operation input via the remote operation screen displayed by the PC 200 or the operation screen displayed by the operation panel 57, for example.

The communication I/F 55 is an interface to connect the operation unit 50 to the network 10. The connection I/F 56 is an interface that makes the operation unit 50 communicate with the main body 40 via the communication path 30.

The operation panel 57 receives various types of input according to the user's operation and displays various types of information (e.g., information according to the received operation, information indicating an operation status of the image processing apparatus 300, and information indicating a setting condition). While in this example, the operation panel 57 includes a liquid crystal display (LCD) having a touch panel function achieved by a second operation receiving unit 510 and a second UI display unit 514, which are described later, the embodiment is not limited thereto. For example, the operation panel 57 may include an organic electroluminescence (EL) display having a touch panel function. Furthermore, the operation panel 57 may be provided with an operation unit such as hardware keys and a display unit such as a lamp.

The external connection I/F 58 is an interface to connect the operation unit 50 to an integrated circuit (IC) card reader 36, for example.

Figure 4:
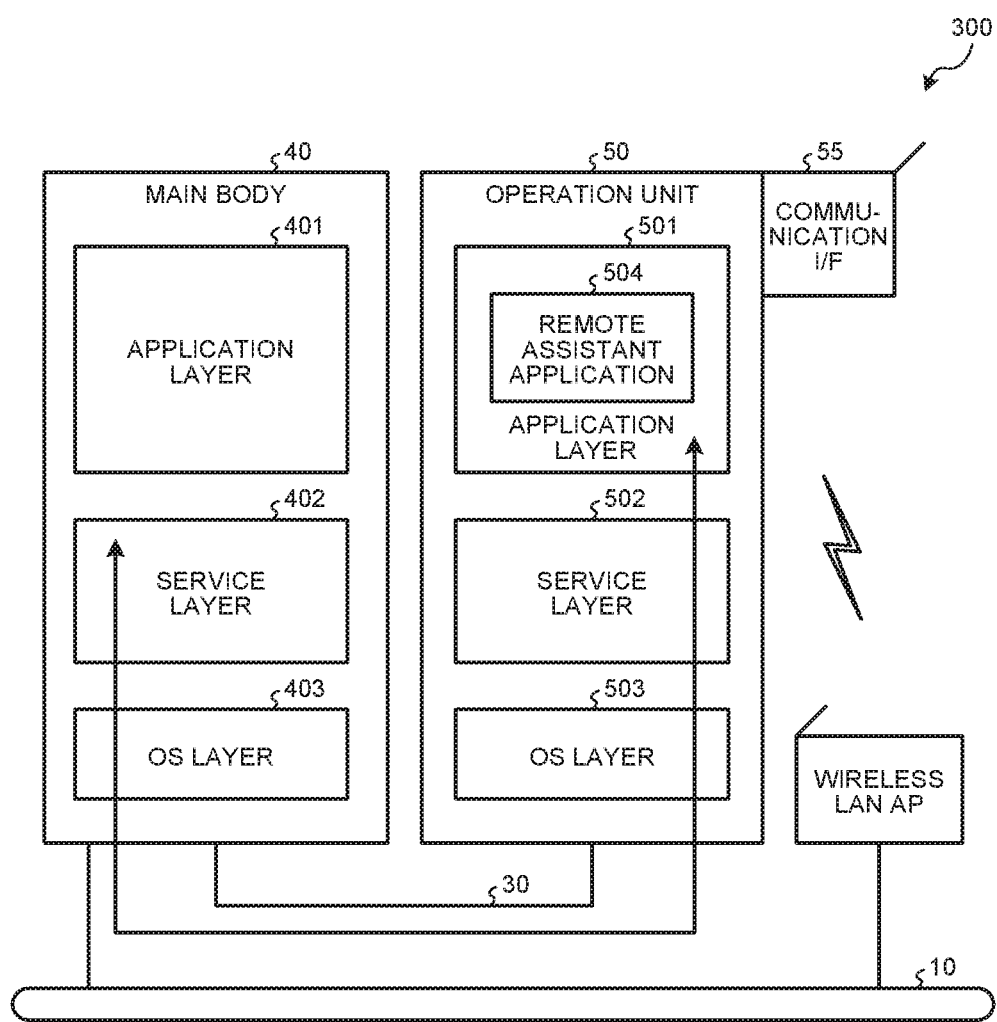
FIG. 4 is a schematic diagram illustrating an exemplary software structure of the image processing apparatus.

The following describes a software structure of the image processing apparatus 300. FIG. 4 is a schematic diagram illustrating an exemplary software structure of the image processing apparatus 300. As illustrated in FIG. 4, the main body 40 includes an application layer 401, a service layer 402, and an OS layer 403. The application layer 401, the service layer 402, and the OS layer 403 are in fact various types of software stored in the ROM 42 and the HDD 44, for example. The CPU 41 executes the various types of software to provide the various functions.

The application layer 401 is application software (in the following description, may be described simply as the "application" in some cases) that causes the hardware resources to operate and provide a certain function. Examples of the application include a copy application that provides the copier function, a scanner application that provides the scanner function, a facsimile application that provides the facsimile function, and a printer application that provides the printer function.

The service layer 402, which is present between the application layer 401 and the OS layer 403, is software that provides an interface to the applications for using the hardware resources included in the main body 40. More specifically, the service layer 402 receives requests to operate the hardware resources and provides a function to arbitrate the operation requests. Examples of the operation requests received by the service layer 402 include a request for the scanner to perform reading and a request for the plotter to perform printing.

The interface function of the service layer 402 is provided to not only the application layer 401 of the main body 40 but also an application layer 501 of the operation unit 50. The application layer 501 (application) of the operation unit 50, thus, can also achieve the functions using the hardware resources (e.g., the engine unit 47) of the main body 40 via the interface function of the service layer 402.

The OS layer 403 is basic software (operating system) that provides a basic function to control the hardware included in the main body 40. The service layer 402, which is software, converts requests to use the hardware resources from the various applications into commands that the OS layer 403 can interpret, and then transfers the commands to the OS layer 403. The OS layer 403, which is software, executes the commands. As a result, the hardware resources operate in accordance with the requests from the applications.

The operation unit 50 includes the application layer 501, a service layer 502, and an OS layer 503. The hierarchical structure among the application layer 501, the service layer 502, and the OS layer 503 of the operation unit 50 is the same as that of the main body 40. The function provided by the application of the application layer 501 and the operation request that the service layer 502 can receive differ from those in the main body 40. The application layer 501 is software that mainly provides a function of a user interface (UI) to operate or display the functions (copier, scanner, facsimile, and printer functions) included in the main body 40. The application layer 501 may be software that operates the hardware resource included in the operation unit 50 to provide a certain function. A remote assistant application 504 that provides a remote assistant is achieved by the application layer 501.

In the embodiment, the software of the OS layer 403 of the main body 40 and the software of the OS layer 503 of the operation unit 50 differ from each other in order to keep independence between the functions of the main body 40 and the operation unit 50. The main body 40 and the operation unit 50, thus, operate independently from each other under the different operating systems. For example, Linux (registered trademark) may be adopted for the software of the OS layer 403 of the main body 40 while Android (registered trademark) may be adopted for the software of the OS layer 503 of the operation unit 50.

As described above, the main body 40 and the operation unit 50 operate under different operating systems in the image processing apparatus 300 according to the embodiment. The communication between the main body 40 and the operation unit 50, thus, is not performed as an interprocess communication in the common apparatus, but as a communication between different apparatuses. Examples of the communication performed as that between different apparatuses include the operation (command communication) that transmits the information (a content of the instruction from the user) received by the operation unit 50 to the main body 40, and the operation of the main body 40 to notify the operation unit 50 of an event. The operation unit 50, thus, can use the functions of the main body 40 by performing the command communication with the main body 40. Examples of an event of which the operation unit 50 is notified by the main body 40 include an implementation state of the operation in the main body 40 and contents set by the main body 40.

In the embodiment, power is supplied to the operation unit 50 from the main body 40 via the communication path 30, thereby making it possible to perform power supply control separately (independently) for the operation unit 50 and the main body 40.

Figure 5:
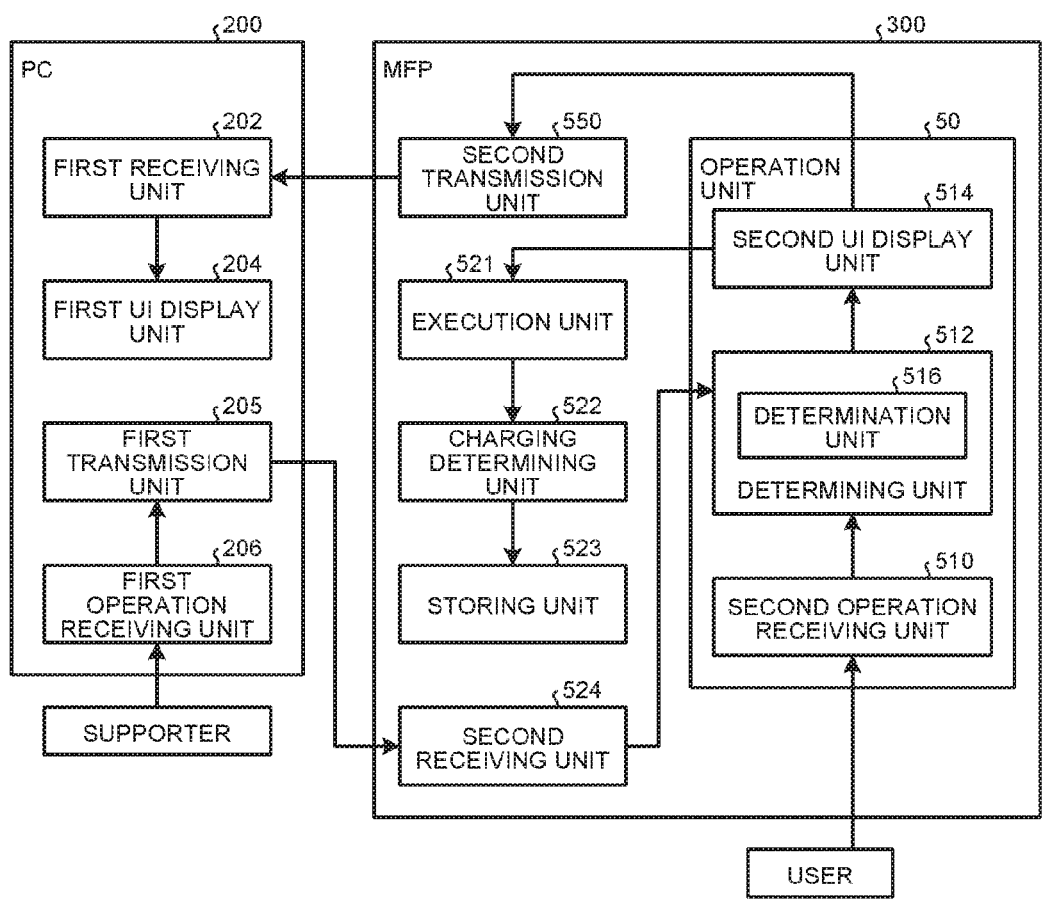
FIG. 5 is a functional block diagram illustrating an overview of the functions included in the PC and the image processing apparatus.

The following describes the functions included in the PC 200 and the image processing apparatus 300. FIG. 5 is a functional block diagram illustrating an overview of the functions included in the PC 200 and the image processing apparatus 300. The PC 200 includes a first receiving unit 202, a first UI display unit 204, a first transmission unit 205, and a first operation receiving unit 206.

The first receiving unit 202 has a function to receive screen information about the image processing apparatus (MFP) 300 so as to display a screen displayed on the image processing apparatus 300 on the PC 200 when a remote connection is established from the PC 200 to the image processing apparatus 300. The first receiving unit 202 outputs the received screen information to the first UI display unit 204.

The first UI display unit 204 displays the screen of the PC 200. The first UI display unit 204 displays the screen displayed on the image processing apparatus 300 when the remote connection is established from the PC 200 to the image processing apparatus 300.

The first operation receiving unit 206 receives operation (e.g., mouse operation or button operation) from the supporter who uses the PC 200. The first transmission unit 205 transmits, to the image processing apparatus 300, operation information indicating a content of the operation when the first operation receiving unit 206 is performing remote operation on the image processing apparatus 300. The first operation receiving unit 206, thus, receives the operation of the PC 200 causing an execution unit 521 to execute a job. The execution unit 521 will be described later.

The image processing apparatus 300 includes the second operation receiving unit 510, a determining unit 512, and the second UI display unit 514, which are included in the operation unit 50, and a second transmission unit 550, the execution unit 521, a charging determining unit 522, a storing unit 523, and a second receiving unit 524. The image processing apparatus 300 includes not only the functions illustrated in FIG. 5 but also the functions described above. The second receiving unit 524 receives the operation information transmitted by the first transmission unit 205 and outputs the received operation information to the determining unit 512.

The second operation receiving unit 510 receives the operation (e.g., touch operation) from the user of the image processing apparatus 300, and notifies the determining unit 512 of the operation information indicating the content of the received operation. The second operation receiving unit 510 receives the operation to cause the execution unit 521 to execute a job.

The determining unit 512 determines, with regard to the received operation information, whether the operation is received from the user of the image processing apparatus 300 or from the operator (remote user) using the PC 200. In other words, the determining unit 512 determines whether the operation is received by the first operation receiving unit 206 or the second operation receiving unit 510. The determining unit 512 adds operator information (refer to FIG. 10B) that is the determination result identifying either the user or the supporter to the operation information, and notifies the second UI display unit 514 of the resulting information.

Figure 13:
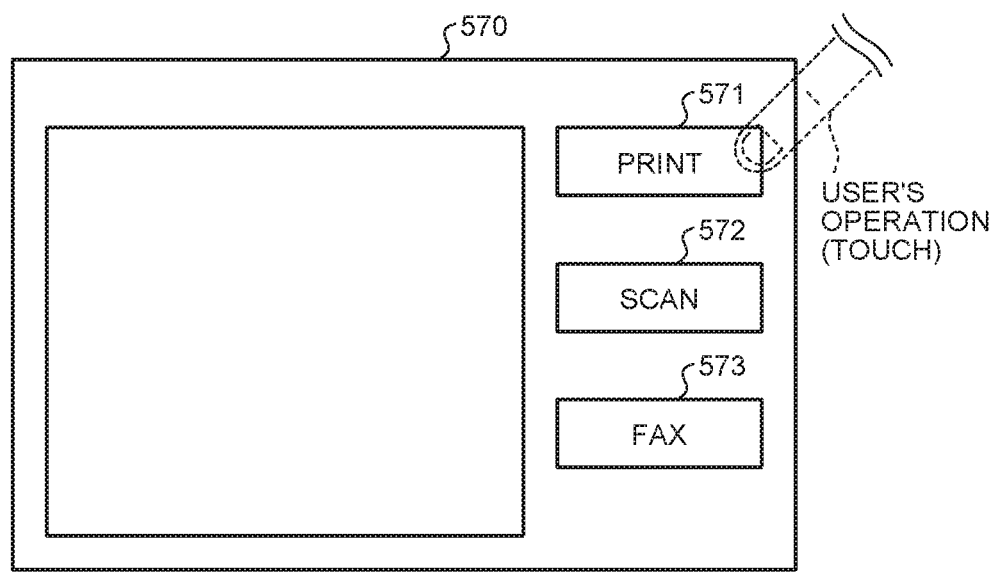
FIG. 13 is a schematic diagram exemplarily illustrating a user interface (UI) screen displayed by the operation panel.
Figure 14:
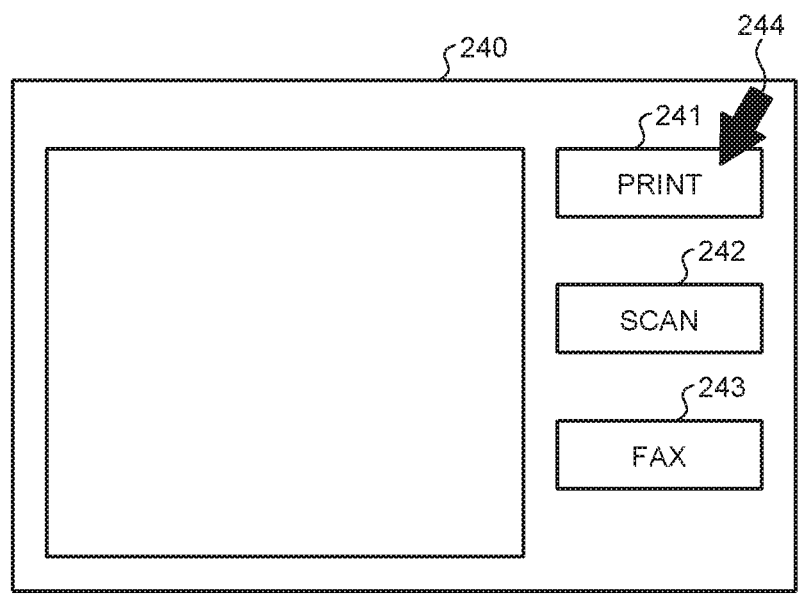
FIG. 14 is a schematic diagram exemplarily illustrating a remote screen displayed by the PC.

Specifically, the determining unit 512 determines, by a determination unit 516, whether the operation received by the first operation receiving unit 206 or the second operation receiving unit 510 instructs the execution of a job. The determination unit 516 determines whether the operation instructs the execution of the job on the basis of the combination of the display for the user (refer to FIGS. 13 and 14) and the operation performed on the display. When the operation instructs the execution of the job, the determining unit 512 determines whether the job executed by the image processing apparatus 300 is the object for which the user should be charged on the basis of the operator information added to the operation information. Examples of the job executed by the image processing apparatus 300 include a print job, for which the user is charged, and a scan job and a facsimile (fax) job sending a fax, for which jobs the user is not charged. The determining unit 512 determines that the job executed by the image processing apparatus 300 is the job for which the user should be charged when the operator information identifies the user and the operation indicated by the operation information instructs the execution of the job for which the user should be charged.

The second UI display unit 514 displays a UI screen 570 (illustrated in FIG. 13) of the operation unit 50. The UI screen 570 is provided with job execution buttons including a print button 571, a scan button 572, and a fax (FAX) button 573. The second UI display unit 514 notifies the second transmission unit 550 of screen display information so as to transmit the screen information displayed on the image processing apparatus 300 to the PC 200 when the image processing apparatus 300 is remotely operated by the PC 200. The second UI display unit 514 requests the execution unit 521 to execute the job when the job execution button displayed on the UI screen 570 is pressed.

The second transmission unit 550 receives the screen information from the second UI display unit 514 and transmits the screen information displayed on the image processing apparatus 300 to the PC 200 so as to cause the PC 200 to display the screen displayed on the image processing apparatus 300 when the image processing apparatus 300 is remotely operated by the PC 200.

When receiving a job execution request from the user or the supporter (remote user), the execution unit 521 executes the job in accordance with the operation. After executing the job, the execution unit 521 requests the charging determining unit 522 to determine charging information.

The charging determining unit 522 determines whether the user should be charged for the job executed by the execution unit 521 using the operator information (the result determined by the determining unit 512) added by the determining unit 512, and causes the storing unit 523 to store therein the determination result. More specifically, the charging determining unit 522 determines that the user should be charged for the job executed by the execution unit 521 when the determining unit 512 determines that the job executed by the image processing apparatus 300 is the job for which the user should be charged, and causes the storing unit 523 to store therein the determination result.

The storing unit 523 stores therein the charging informing (the result determined by the charging determining unit 522). For example, the charging information (refer to FIG. 9) is stored that indicates the number of colored pages printed by the image processing apparatus 300. The information is necessary when the user is actually charged for the print job. In the embodiment, the job is printing. The job is, however, not limited to the printing. The job may be another job serving as an object for which the user is to be charged, such as the job using the scanner function, the facsimile function, or the copier function.

The functions of the respective units (e.g., the execution unit 521, the charging determining unit 522, and the determining unit 512) of the image processing apparatus 300 are achieved by the CPU 41 (or the CPU 51) executing a computer program stored in a storage device (e.g., the ROM 42, the HDD 44, the ROM 52, or the flash memory 54). The functions are not limited to being achieved as described above. At least a part of the functions of the respective units of the image processing apparatus 300 may be achieved by a dedicated hardware circuit (e.g., a semiconductor integrated circuit), for example. The storing unit 523 may be achieved by the HDD 44 included in the main body 40 or by the flash memory 54 included in the operation unit 50, for example.

In the embodiment, the main body 40 and the operation unit 50 operate independently from each other under the different operating systems. The embodiment is not limited thereto. For example, the main body 40 and the operation unit 50 may operate under the same operating system.

The program executed by the image processing apparatus 300 in the embodiment may be recorded and provided on a non-transitory computer-readable recording medium such as a compact disc ROM (CD-ROM), a flexible disk (FD), a CD-recordable (CD-R), a digital versatile disc (DVD), and a universal serial bus (USB), as an installable or executable file. The program may be provided or distributed via a network such as the Internet. The various programs may be embedded in and provided on a non-volatile recording medium such as a ROM.

The system structure of the image processing system 100, in which the PC 200 and the image processing apparatus 300 are connected, in the embodiment is an example. Various system structures are applicable depending on usages and purposes. For example, the image processing apparatus 300 may include the function of the first operation receiving unit 206.

Figure 6:
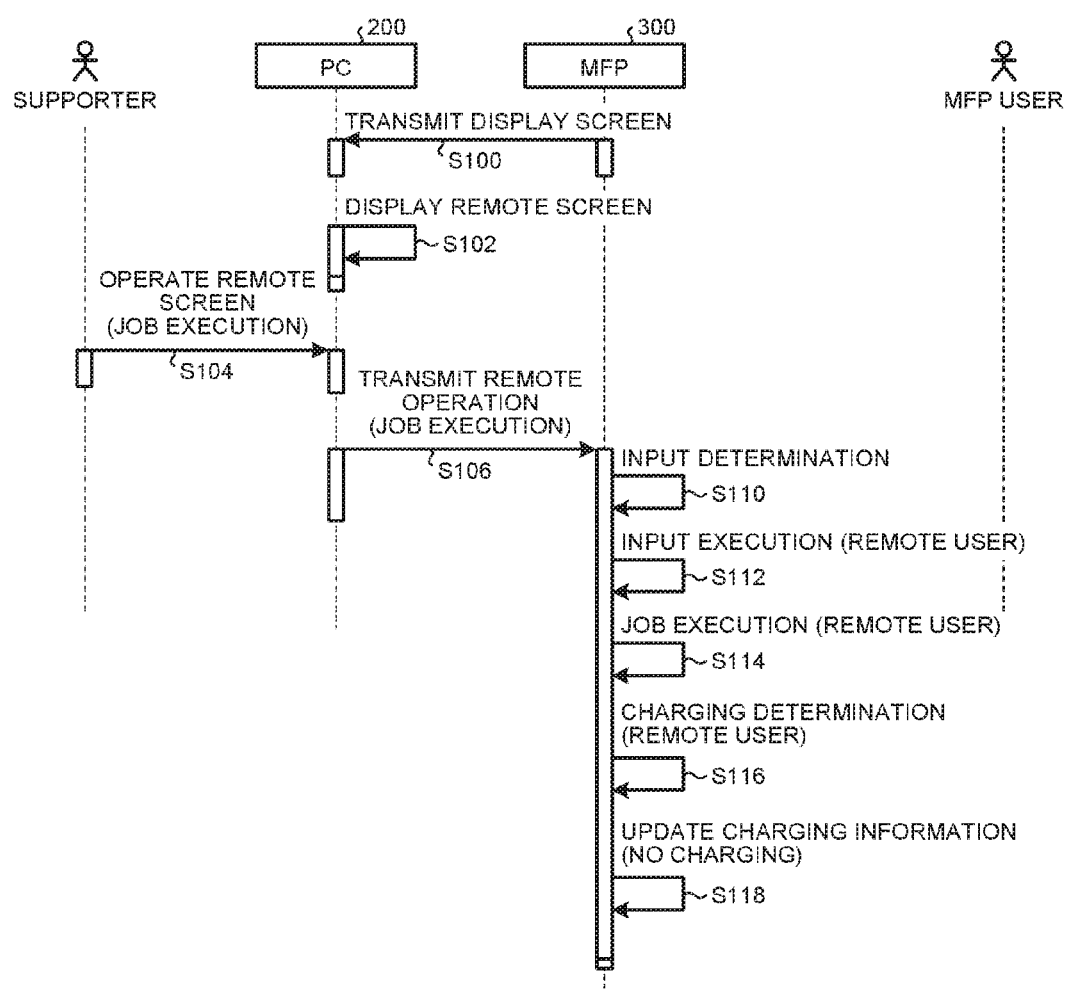
FIG. 6 is a sequence diagram illustrating the operation of the image processing system when a supporter causes the image processing apparatus to execute a print job through remote operation.

The following describes the operation of the image processing system 100 in detail. FIG. 6 is a sequence diagram illustrating the operation of the image processing system 100 when the supporter is causing the image processing apparatus 300 to execute a print job through remote operation.

After the supporter connects the PC 200 to the image processing apparatus 300 serving as the remote operation target, the second transmission unit 550 of the image processing apparatus 300 transmits the screen information displayed on the second UI display unit 514 to the PC 200, so that the PC 200 can grasp the screen displayed on the second UI display unit 514 of the image processing apparatus 300 (step S100).

The first receiving unit 202 of the PC 200 receives the screen information from the image processing apparatus 300 and causes the first UI display unit 204 of the PC 200 to display a remote screen 240 (illustrated in FIG. 14) in the same manner as the UI screen 570 described above (step S102). The remote screen 240 is provided with the job execution buttons including a print button 241, a scan button 242, and a FAX button 243.

The supporter designates the job execution button using a cursor 244 and clicks the designated job execution button when the supporter is performing operation on the remote screen 240 displayed on the PC 200. The supporter is assumed to mistakenly press a print job execution button (the object for which the user is to be charged). As a result, information about the click operation is input to the first operation receiving unit 206 of the PC 200 (step S104).

Thereafter, the first operation receiving unit 206 of the PC 200 notifies the determining unit 512 of the image processing apparatus 300 of the operation information (step S106).

The image processing apparatus 300 determines that the operation is input through the PC 200 (step S110), executes the input provided by the supporter (remote user) (step S112), and executes the job corresponding to the input provided (step S114). The image processing apparatus 300 determines whether the user is to be charged for the executed job (step S116) and updates the charging information to be stored (step S118). The job is executed as a result of the operator mistakenly causing the image processing apparatus 300 to execute the print job. The executed job is, thus, determined not to be the object for which the user is to be charged. The operation of the image processing apparatus 300 corresponding to the processing from step S110 to step S118 is described in detail with reference to FIG. 7.

Figure 7:
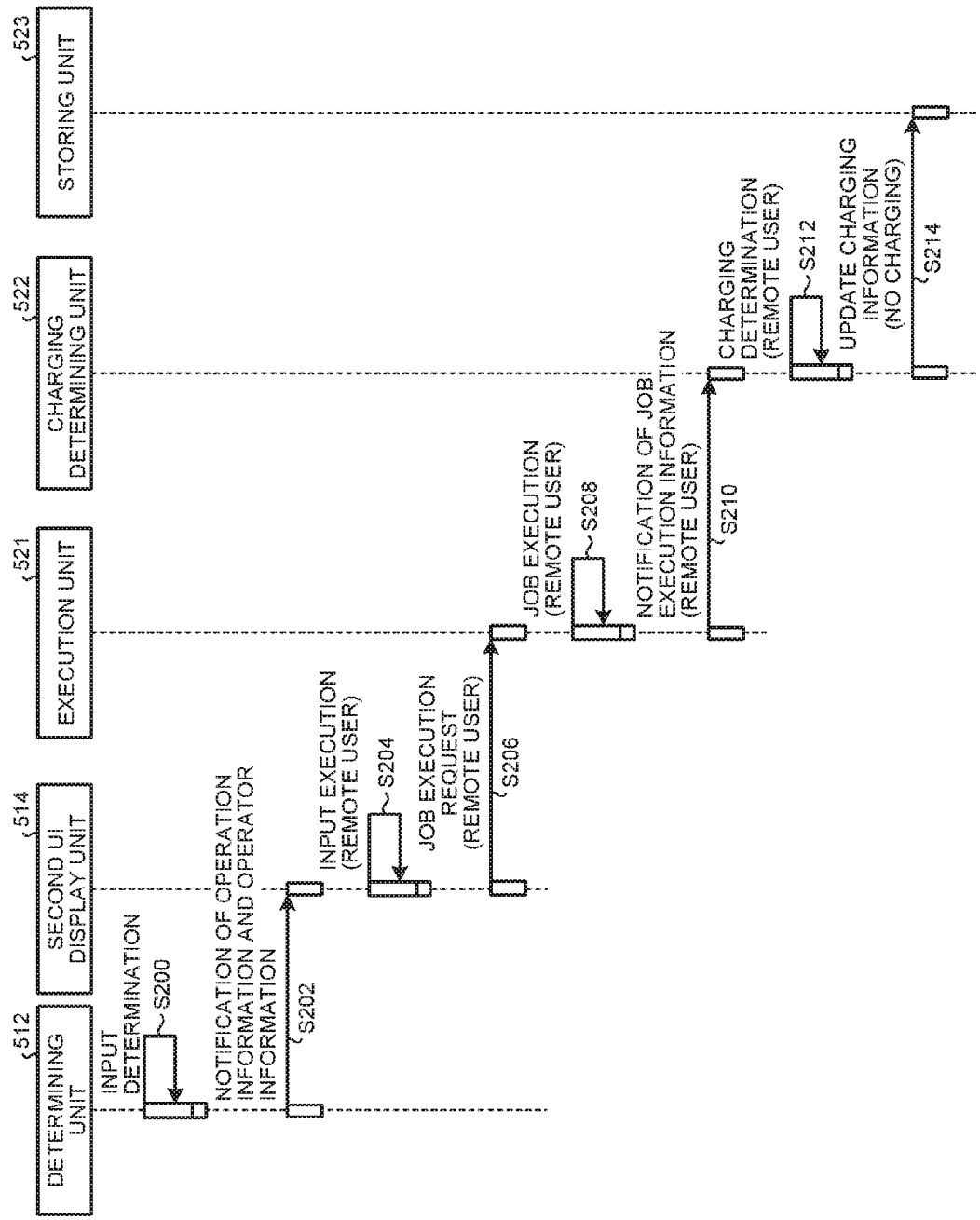
FIG. 7 is a sequence diagram illustrating the operation of the image processing apparatus when the supporter has mistakenly caused the image processing apparatus to execute a print job through remote operation.

FIG. 7 is a sequence diagram illustrating the operation of the image processing apparatus 300 when the supporter has mistakenly caused the image processing apparatus 300 to execute the print job through remote operation.

The determining unit 512 determines whether the operation is from the PC 200 or the image processing apparatus 300 by determining whether the user has directly touched the operation panel 57 of the image processing apparatus 300 (refer to FIG. 13), for example (step S200). In this example, the operation is the click operation from the PC 200. The determining unit 512, thus, adds, to the click operation information, the information (operator information) of the operation being from the supporter who is performing the remote operation, and transmits the resulting information to the second UI display unit 514 (step S202).

The second UI display unit 514 detects that the job execution button has been pressed on the basis of the received information (step S204, execution of the input) and requests the execution unit 521 to execute the print job (step S206). At this time, the second UI display unit 514 transmits the operator information added by the determining unit 512, too.

When receiving the request to execute the print job, the execution unit 521 executes the print job (step S208). After executing the print job, the execution unit 521 notifies the charging determining unit 522 of the operator information added by the determining unit 512 together with execution information (information about the charging such as the number of prints and whether being colored printing or monochrome printing) about the executed job (step S210).

The charging determining unit 522 determines whether the job is an object for which the user should be charged using the operator information (step S212) and updates the charging information about the execution of the job, which is to be stored in the storing unit 523 (step S214). In this example, the job is executed by the supporter, and the storing unit 523 stores therein the executed job as the job for which the user is not to be charged. The storing unit 523 stores therein the result determined by the charging determining unit 522 in such a manner that the job executed by the execution unit 521 is classified into colored printing and monochrome printing.

Figure 8:
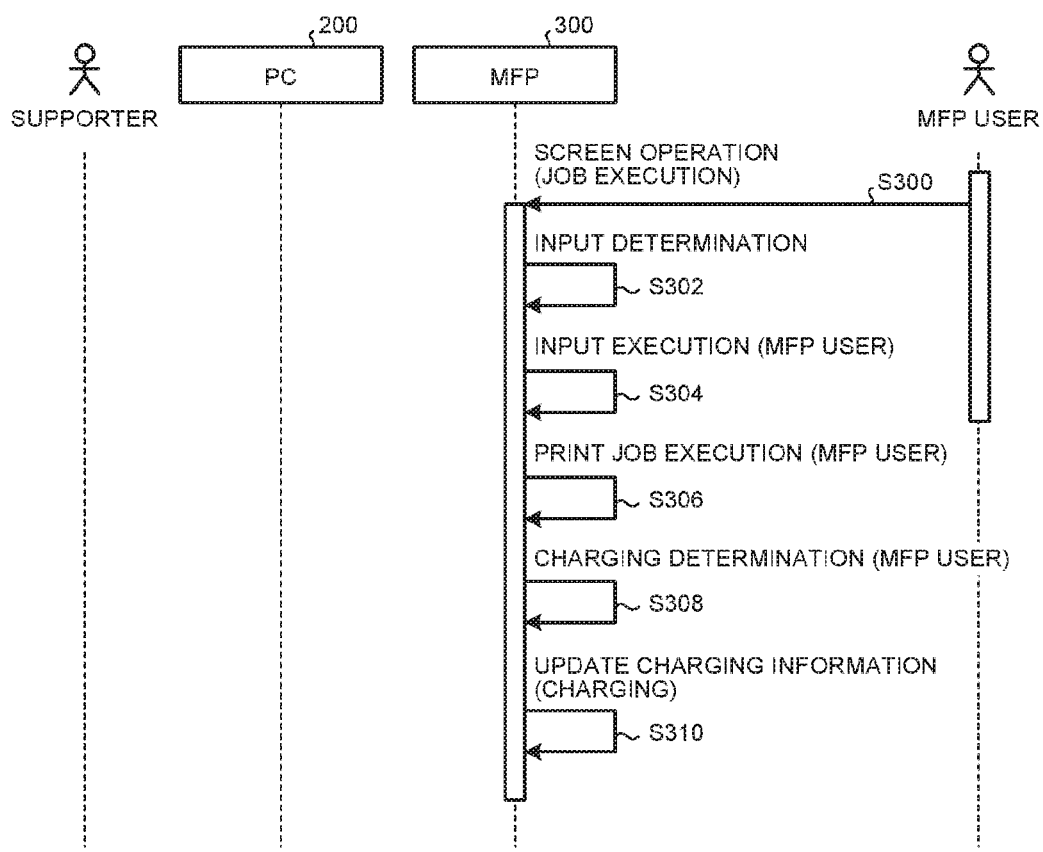
FIG. 8 is a sequence diagram illustrating the operation of the image processing system when the user has caused the image processing apparatus to execute a print job using an operation panel of the image processing apparatus.

FIG. 8 is a sequence diagram illustrating the operation of the image processing system 100 when the user has caused the image processing apparatus 300 to execute a print job using the operation panel 57 of the image processing apparatus 300.

When the user has touched (operated) the job execution button on the screen displayed on the second UI display unit 514 of the image processing apparatus 300 (step S300), the information of the user touching the screen is input to the second operation receiving unit 510. Thereafter, the second operation receiving unit 510 notifies the determining unit 512 of the operation information from the user (step S302).

The determining unit 512 determines whether the operation is from the PC 200 or the image processing apparatus 300 by determining whether the user has touched the operation panel 57 of the image processing apparatus 300. In this example, the input is from the image processing apparatus 300. The determining unit 512, thus, adds, to the operation information, the operator information indicating that the user operated the operation panel 57, and transmits the resulting information to the second UI display unit 514 (step S304).

The second UI display unit 514 detects that the job execution button has been pressed on the basis of the operation information and requests the execution unit 521 to execute the print job. At this time, the second UI display unit 514 also transmits the operator information added by the determining unit 512.

When receiving the request to execute the print job, the execution unit 521 executes the print job (S306). After executing the print job, the execution unit 521 transfers the operator information added by the determining unit 512 to the charging determining unit 522 together with the information (information about the charging such as the number of prints and whether being colored printing or monochrome printing) about the executed job.

The charging determining unit 522 determines whether the job is a job for which the user is to be charged using the operator information (step S308) and updates the charging information about the execution of the job, which is to be stored in the storing unit 523 (step S310). In this example, the job is executed by the user, and the storing unit 523 stores therein the executed job as the job for which the user is to be charged.

FIG. 9 is a schematic diagram exemplarily illustrating a data structure of the charging information stored in the storing unit 523. As exemplarily illustrated in FIG. 9, the charging information is separated into information about the object for which the user is to be charged (described as the object for charging) and information about the job for which the user is not to be charged (described as the object for no charging). The object for charging is stored when the user of the image processing apparatus 300 executes the print job. For example, the storing unit 523 stores therein that the number of colored prints is 100 and the number of monochrome prints is 50 as the object for charging on the basis of the types of prints after the job executed by the execution unit 521.

The object for no charging is stored when the supporter is executing the print job. The data stored as the object for no charging is excluded when the user is to be charged. The user of the image processing apparatus 300 is, thus, prevented from being charged even when the supporter is executing the print job.

FIGS. 10A and 10B are schematic diagrams exemplarily illustrating data structures of the operation information and the operator information. The operation information illustrated in FIG. 10A is a value that indicates what kind of operation is performed by the supporter or the user. FIG. 10A illustrates the information that a position having an x-coordinate of 100 and a y-coordinate of 200 is clicked on the screen. The operator information illustrated in FIG. 10B is added to the operation information by the determining unit 512. The operator information indicates whether the notified operation information is received from the supporter or the user. FIG. 10B illustrates that the operation information is notified from the supporter.

In the image processing system 100 in the embodiment, the determining unit 512 determines whether the operation is received by the first operation receiving unit 206 or the second operation receiving unit 510, the charging determining unit 522 determines whether the job executed by the execution unit 521 is the object for charging, and the storing unit 523 stores therein the result determined by the charging determining unit 522. As a result, when the supporter has mistakenly executed a job that causes the user to be charged for the job while remotely operating the operation screen of the image processing apparatus 300 that the user uses, the image processing system 100 makes it possible that the user is not to be charged for the job. The method for controlling the image processing system 100 as described above is a control method according to an embodiment of the invention.

Figure 11:
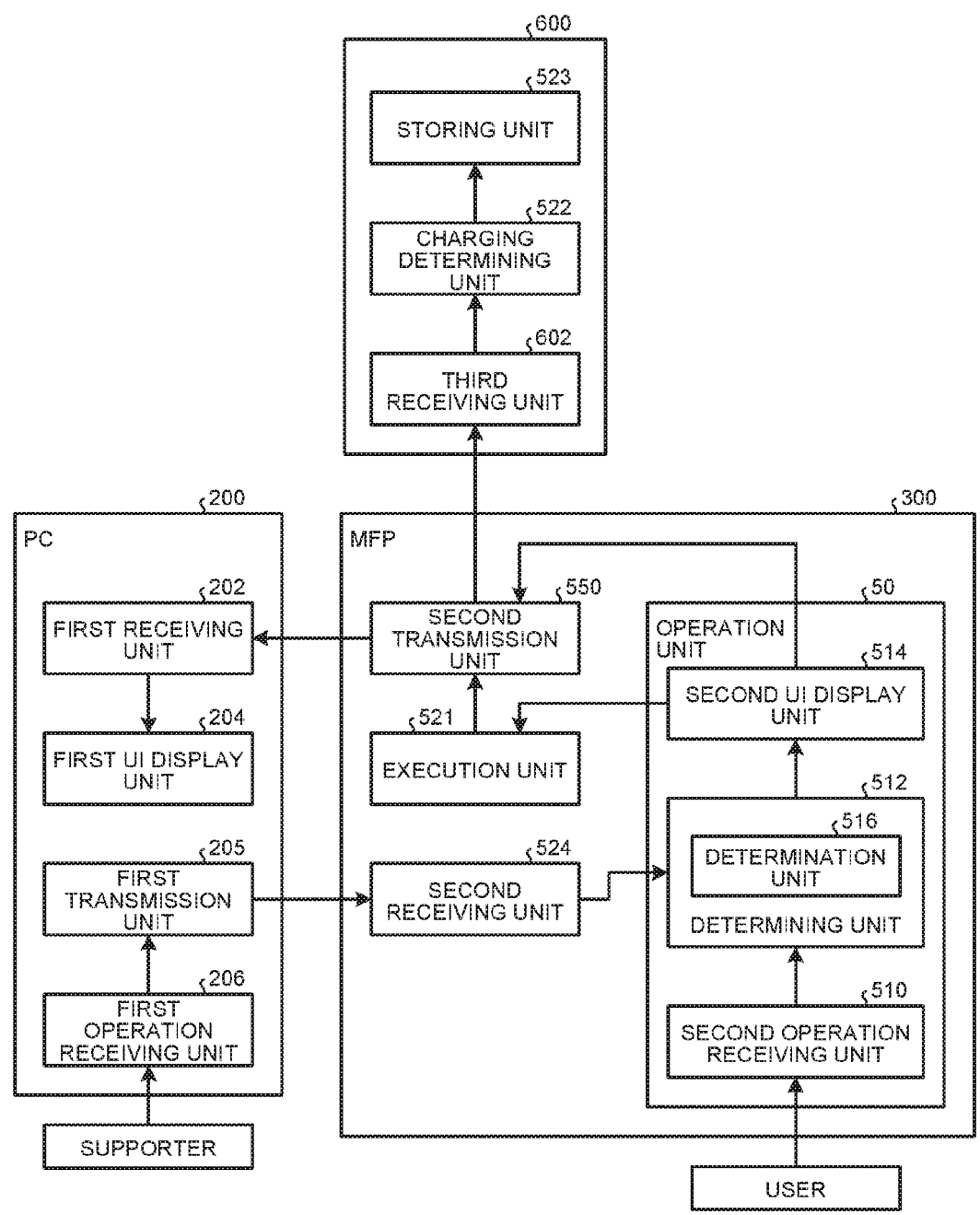
FIG. 11 is a schematic diagram illustrating a modification of the image processing system.

The following describes a modification of the image processing system 100. FIG. 11 is a schematic diagram illustrating the modification of the image processing system 100. As illustrated in FIG. 11, the modification of the image processing system 100 includes the PC 200, the image processing apparatus 300, and a server 600. The server 600 includes a third receiving unit 602, the charging determining unit 522, and the storing unit 523. In FIG. 11, the components that are substantially the same as those illustrated in FIG. 5 have the same numerals. The second transmission unit 550 also includes a function as a server transmission unit that transmits information to the server 600.

The third receiving unit 602 (server's receiving unit) receives, via the second transmission unit 550, the information that indicates the job executed by the execution unit 521 of the image processing apparatus 300, and outputs the received information to the charging determining unit 522. The charging determining unit 522 and the storing unit 523 may be included in the image processing apparatus 300 as described in the embodiment or may be included in the external server 600 as described in the modification.

Figure 12:
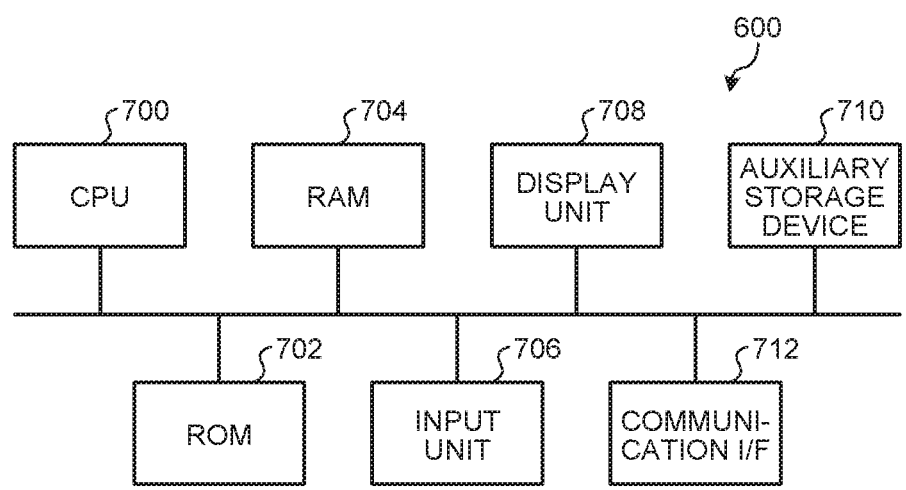
FIG. 12 is a schematic diagram illustrating a hardware structure of a server.

FIG. 12 is a schematic diagram illustrating a hardware structure of the server 600. As illustrated in FIG. 12, the server 600 includes a CPU 700, a ROM 702, a RAM 704, an input unit 706, a display unit 708, an auxiliary storage device 710, and a communication I/F 712.

The communication I/F 712 has the function of the third receiving unit 602. The charging determining unit 522 is achieved by the CPU 700 reading software (a computer program) stored in a storage device (e.g., the ROM 702 or the auxiliary storage device 710) and executing the read program. The software (program) is loaded in the RAM 704. The storing unit 523 is structured by the auxiliary storage device 710, for example.

Figure 15:
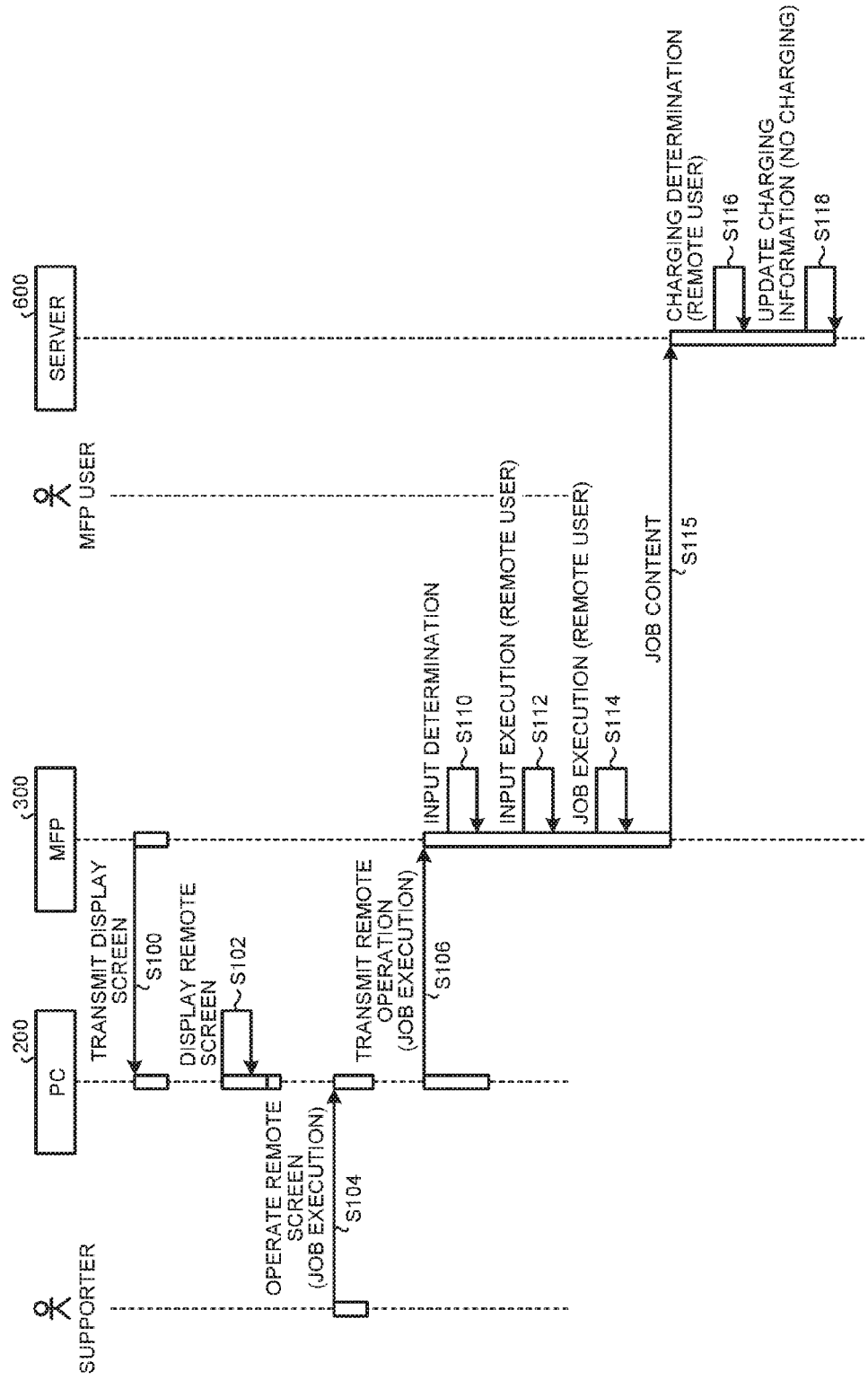
FIG. 15 is a sequence diagram illustrating the operation of the image processing system in the modification when the supporter is causing the image processing apparatus to execute a print job through remote operation.

The following describes the operation of the image processing system 100 in the modification. FIG. 15 is a sequence diagram illustrating the operation of the image processing system 100 in the modification when the supporter is causing the image processing apparatus 300 to execute a print job through remote operation.

After the supporter connects the PC 200 to the image processing apparatus 300 that the supporter remotely operates, the second transmission unit 550 of the image processing apparatus 300 transmits the screen information displayed on the second UI display unit 514 to the PC 200 so as to enable the PC 200 to grasp the screen displayed on the second UI display unit 514 of the image processing apparatus 300 (step S100).

The first receiving unit 202 of the PC 200 receives the screen information from the image processing apparatus 300 and causes the first UI display unit 204 of the PC 200 to display the remote screen 240 (illustrated in FIG. 14) in the same manner as the UI screen 570 described above (step S102). The remote screen 240 is provided with the job execution buttons including the print button 241, the scan button 242, and the FAX button 243.

The supporter designates the job execution button using the cursor 244 and clicks the designated job execution button when the supporter is performing operation on the remote screen 240 displayed on the PC 200. In this process, the supporter is assumed to mistakenly press the print job execution button, which is the object for which the user is charged. The information about the click operation is input to the first operation receiving unit 206 of the PC 200 (step S104).

The first operation receiving unit 206 of the PC 200 notifies the determining unit 512 in the image processing apparatus 300 of the operation information (step S106).

The image processing apparatus 300 determines that the operation is input via the PC 200 (step S110), executes the input by the supporter (remote user) (step S112), and executes the job corresponding to the input (step S114).

The image processing apparatus 300 transmits, to the server 600, the operation information to which the operator information is added (hereinafter, the operation information to which the operator information is added is described as the job content) (step S115). The sever 600 determines whether the user is charged for the executed job (step S116) and updates the charging information to be stored (step S118). In this example, the job is executed as the result of the supporter mistakenly causing the image processing apparatus 300 to execute the print job. The executed job is, thus, determined not to be the object for which the user is charged. The operation of the image processing system in the modification corresponding to the processing from step S110 to step S118 is described in detail with reference to FIG. 16.

Figure 16:
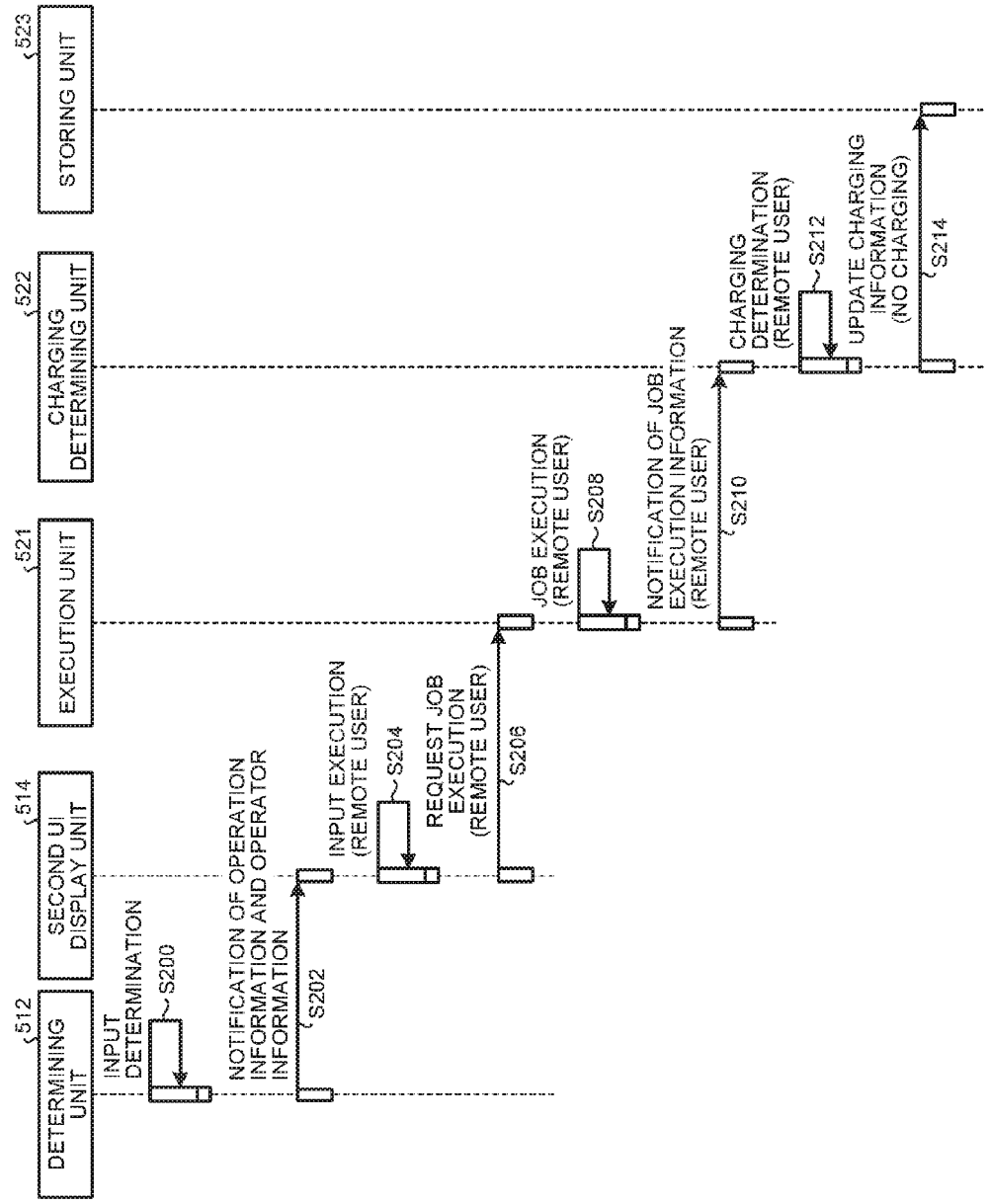
FIG. 16 is a sequence diagram illustrating the operation of the image processing system in the modification when the supporter has mistakenly caused the image processing apparatus to execute a print job through remote operation.

FIG. 16 is a sequence diagram illustrating the operation of the image processing system in the modification when the supporter has mistakenly caused the image processing apparatus 300 to execute the print job through remote operation.

The determining unit 512 determines whether the operation is from the PC 200 or the image processing apparatus 300 by determining whether the user has directly touched the operation panel 57 of the image processing apparatus 300 (refer to FIG. 13), for example (step S200). In this example, the operation is from the PC 200 by the click operation. The determining unit 512, thus, adds the information (operator information) of the operation being from the supporter who is performing the remote operation to the click operation information, and transmits the resulting information to the second UI display unit 514 (step S202).

The second UI display unit 514 detects that the job execution button has been pressed on the basis of the received information (step S204, input execution) and requests the execution unit 521 to execute the print job (step S206). At this time, the second UI display unit 514 transmits the operator information added by the determining unit 512, too.

When receiving the request to execute the print job, the execution unit 521 executes the print job (step S208). After executing the print job, the execution unit 521 notifies the charging determining unit 522 of the operator information added by the determining unit 512 together with the execution information (information about the charging such as the number of prints and whether color printing or monochrome printing) about the executed job via the second transmission unit 550 and the third receiving unit 602 (step S210).

The charging determining unit 522 determines whether the job is an object for which the user should be charged using the operator information (step S212), and updates the charging information about the execution of the job, which is to be stored in the storing unit 523 (S214). In this example, the job is executed by the supporter. The storing unit 523, thus, stores therein the executed job as the job for which the user is not to be charged.

FIG. 17 is a sequence diagram illustrating the operation of the image processing system 100 in the modification when the user has caused the image processing apparatus 300 to execute a print job.

When the user has touched (operated) the job execution button on the screen displayed on the image processing apparatus (MFP) 300, the information about the screen operation (job execution) of the user touching the screen is input to the image processing apparatus 300 (step S300). The image processing apparatus 300 determines whether the operation is from the PC 200 or the image processing apparatus 300 by determining whether the information about the screen operation is input by the user touching the image processing apparatus 300 (step S302, input determination). In this example, the input is from the image processing apparatus 300. The image processing apparatus 300, thus, adds the operator information indicating the user's operation to the operation information, and starts the operation according to the input operation (step S304, input execution).

The image processing apparatus 300 executes the print job in accordance with the input operation (step S306). After the execution of the print job, the image processing apparatus 300 notifies the server 600 of the operator information together with the execution information (the operation information including the information about charging such as the number of prints and whether being colored printing or monochrome printing) about the executed job as the job content (step S307).

The server 600 determines whether the job executed by the image processing apparatus 300 is a job for which the user should be charged using the operation information and the operator information (step S308) and updates the charging information, which is to be stored, about the execution of the job (step S310). In this example, the job is executed by the user. The server 600, thus, stores the executed job as the job for which the user is to be charged.

Even when the supporter has mistakenly executed a job that causes the user to be charged for the job when remotely operating the operation screen of the information processing apparatus that the user uses, the embodiment makes it possible that the user is not to be charged for the job.

The present invention is described with reference to a preferred embodiment. Although the invention is described on the basis of specific examples, it is apparent that the specific examples can be modified and changed in various ways without departing from the spirit and wide scope of the invention specified in the claims. The invention is not limited to details of the specific examples or the accompanying drawings.

The embodiments of the present invention have an advantage of allowing the user not to be charged for a job when the supporter has mistakenly executed a job that causes the user to be charged while the supporter operates the operation screen of the information processing apparatus that the user uses through remote operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system, comprising:
an information processing apparatus that is capable of being remotely operated by a remote operation terminal of an operation supporter via a network,
the remote operation terminal comprising:
a first operation receiving unit that receives operation supporter instructions for a job on the information processing apparatus; and
a transmission unit that transmits, through the network to the information processing apparatus, operation information corresponding to the operation supporter instructions received by the first operation receiving unit; and
the information processing apparatus comprising:
a receiving unit that receives the operation information transmitted by the transmission unit of the remote operation terminal through the network;
a second operation receiving unit that receives user operation instructions for the job to be executed by the execution unit and outputs operation information corresponding to the received user operation instructions;
an execution unit that executes the job in accordance with received operation information;
a determining unit that determines whether the received operation information corresponds to an operation supporter instruction received by the first operation receiving unit or a user operation instruction received by the second operation receiving unit, and outputs operator information indicating that the received operation information corresponds to a user operation instruction or that the received operation information corresponds to an operation supporter instruction;
a charging determining unit that determines, based on the operator information from the determining unit, to perform charging in the case that the operator information indicates that the received operation information corresponds to a user operation instruction, and not to perform charging in the case that the operator information indicates that the received operation information corresponds to an operation supporter instruction; and
a storing unit that stores therein a result determined by the charging determining unit.

2. The information processing system according to claim 1, wherein the determining unit includes a determination unit that determines whether the operation an instruction received by the first operation receiving unit or the second operation receiving unit is execution of a job, and the charging determining unit determines whether to perform charging for the job executed by the execution unit, in accordance with the result determined by the determining unit when the determination unit determines that the instruction indicates execution of the job.

3. The information processing system according to claim 1, wherein the second operation receiving unit is a touch panel that receives the user operation instructions provided by a user, and the determining unit determines whether the operation instruction is received by the first operation receiving unit or the second operation receiving unit by determining whether the user has touched the second operation receiving unit.

4. The information processing system according to claim 1, wherein the execution unit executes printing as the job.

5. The information processing system according to claim 4, wherein the storing unit stores therein the result determined by the charging determining unit in such a manner that the job executed by the execution unit is grouped into color printing or monochrome printing.

6. The information processing system according to claim 1, wherein when the job executed by the execution unit is a print job and the result determined by the determining unit is that the operation instruction is received by the second operation receiving unit, the charging determining unit determines that the job is an object for charging.

7. An information processing system, comprising an information processing apparatus that is capable of being remotely operated by a remote operation terminal of an operation supporter via a network to which a server is connected,
the remote operation terminal comprising:
a first operation receiving unit that receives operation supporter instructions for a job on the information processing apparatus; and
a transmission unit that transmits, through the network to the information processing apparatus, operation information corresponding to the operation supporter instructions received by the first operation receiving unit; and the information processing apparatus comprising:
- a receiving unit that receives the operation information transmitted by the transmission unit of the remote operation terminal through the network;
- a second operation receiving unit that receives user operation instructions for the job to be executed by the execution unit and outputs operation information corresponding to the received user operation instructions;
- an execution unit that executes the job in accordance with received operation information;
- a determining unit that determines whether the received operation information corresponds to an operation supporter instruction received by the first operation receiving unit or a user operation instruction received by the second operation receiving unit, and outputs operator information indicating that the received operation information corresponds to a user operation instruction or that the received operation information corresponds to an operation supporter instruction;
- a charging determining unit that determines, based on the operator information from the determining unit, to perform charging in the case that the operator information indicates that the received operation information corresponds to a user operation instruction, and not to perform charging in the case that the operator information indicates that the received operation information corresponds to an operation supporter instruction; and
- a server transmission unit that transmits the result determined by the determining unit to the server, the server comprising:
  - a server's receiving unit that receives the result determined by the determining unit from the server transmission unit;
  - a charging determining unit that determines the job executed by the execution unit is an object for charging in accordance with the result determined by the determining unit; and
  - a storing unit that stores therein a result determined by the charging determining unit.

8. A control method for controlling an information processing system including an information processing apparatus that is capable of being remotely operated by a remote operation terminal of an operation supporter via a network, the control method comprising:
- receiving, by a first operation receiving unit of the remote operation terminal, operation supporter instructions for a job on the information processing apparatus and transmitting operation information corresponding to the operation supporter instructions received by the first operation receiving unit, through the network to the information processing apparatus;
- receiving, by a second receiving unit of the information processing apparatus, user operation instructions for the job to be executed the information processing apparatus to execute the job based on the user operation instructions;
- executing, by the information processing apparatus, the job in accordance with received operation information;
- determining, by a determining unit of the information processing apparatus, whether the received operation information corresponds to an operation supporter instruction received by the first operation receiving unit or a user operation instruction received by the second operation receiving unit, and outputting by the determining unit operator information indicating that the received operation information corresponds to a user operation instruction or that the received operation information corresponds to an operation supporter instruction;
- determining, by a charge determining unit and based on the operator information from the determining unit, to perform charging in the case that the operator information indicates that the received operation information corresponds to a user operation instruction, and not to perform charging in the case that the operator information indicates that the received operation information corresponds to an operation supporter instruction; and
- storing the result of the determination whether the executed job is an object for charging.

* * * * *